United States Patent [19]

Yamada et al.

[11] 4,406,938

[45] Sep. 27, 1983

[54] DISCHARGE MACHINING APPARATUS

[75] Inventors: Shigeo Yamada; Tamio Takawashi; Toshimitsu Sakakibara, all of Aichi, Japan

[73] Assignee: Mitsubishi Denki Kabushiki Kaisha, Tokyo, Japan

[21] Appl. No.: 302,270

[22] Filed: Sep. 15, 1981

[30] Foreign Application Priority Data

Sep. 17, 1980 [JP] Japan ................... 55-129869
Sep. 17, 1980 [JP] Japan ................... 55-129870

[51] Int. Cl.$^3$ ............................................. B23P 1/08
[52] U.S. Cl. ........................... 219/69 D; 219/69 R; 219/69 S; 204/129.6; 137/455
[58] Field of Search ............... 219/69 R, 69 S, 69 D, 219/69 V, 69 M; 204/129.6, 129.7, 134, 137, 145, 147; 137/455

[56] References Cited

U.S. PATENT DOCUMENTS

| | | | |
|---|---|---|---|
| 985,160 | 2/1911 | Goodyear | 137/455 X |
| 3,094,469 | 6/1963 | Strauss et al. | 204/129.6 X |
| 3,144,542 | 8/1964 | Haas et al. | 219/69 D |
| 3,748,427 | 7/1973 | Baldwin | 219/69 S |
| 3,878,352 | 4/1975 | Inoue | 219/69 D |
| 4,222,834 | 9/1980 | Bacon et al. | 204/129.6 |

*Primary Examiner*—M. H. Paschall
*Attorney, Agent, or Firm*—Sughrue, Mion, Zinn, Macpeak and Seas

[57] ABSTRACT

A discharge machining apparatus wherein the workpiece is supported over an aperture in the work support plate on top of a tank at the machining station for cooperation with an electrode movable toward and away from the workpiece in alignment with the aperture. A machining solution recirculation device injects the solution into the tank and removes the solution from the tank at a greater rate than it is injected into the tank. Additional fluid is directed into the tank through the aperture between the workpiece and electrode. An additional conduit having a solenoid controlled valve is provided for supplying an excess of solution to the tank upon raising of the electrode to overflow the tank and remove all sludge and combustible gases. The exhaust pipe for the solution is also adjustably mounted within the tank to more effectively position the inlet of the exhaust pipe for the optimum removal of combustible gases. A pressure release valve is provided in the side wall of the tank to vent explosive gases and prevent damage to the workpiece and electrode.

2 Claims, 3 Drawing Figures

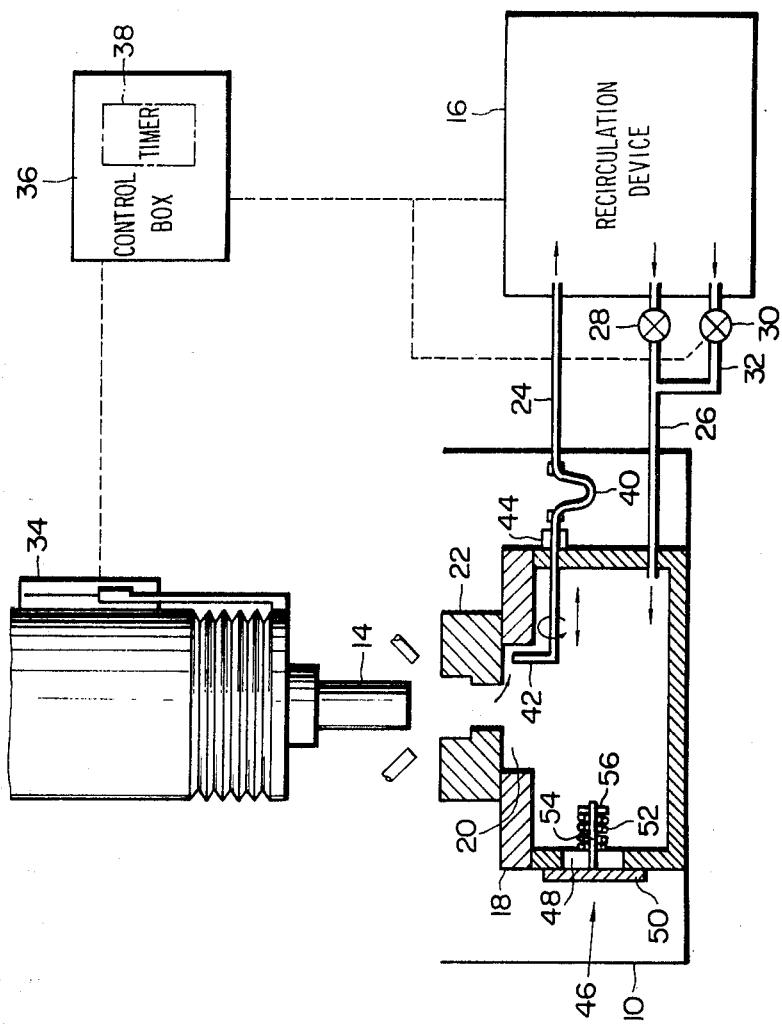

DISCHARGE MACHINING APPARATUS

BACKGROUND OF THE INVENTION

The present invention is directed to a discharge machining apparatus and more particularly to improvements in such apparatus whereby accidents are prevented such as explosions caused by combustible gases produced from discharge machining which takes place in conjunction with a machining solution.

When discharge machining is carried out in the presence of a machining solution, it is a known fact that a sludge and combustible gases are produced. At the machining station where such discharge machining takes place the sludge and combustible gases thus produced will fill the machining station. The presence of the accumulated sludge will decrease the machining performance and an explosion of the combustible gases can damage the discharge machining apparatus.

In a conventional discharge machining apparatus of the type shown in FIG. 1, a machining station includes a tank 12 adapted to contain a machining solution, an overflow container 10 an electrode 14 and a device 16 for circulating a machining solution into and out of the tank 12. A machining anvil block 18 is placed on the upper end of the tank 12 and a workpiece 22 is fixed onto the upper surface of the block 18 over the hole 20 in alignment with the electrode 14 which is disposed above the block. The machining solution recirculation device 16 includes an exhaust pipe 24 for removing the solution from the tank 12 and an injection pipe 26 for supplying the solution into the tank 12.

In the operation of the conventional discharge machining apparatus of FIG. 1 the machining solution recirculation device 16 is operated as the electrode 14 approaches the workpiece 22 so that the machining solution is simultaneously withdrawn through the exhaust pipe 24 and supplied through the injection pipe 26. The recirculation device 16 is set so that the amount of machining solution withdrawn through the exhaust pipe 24 is greater than the amount of solution introduced into the tank 12 through the injection pipe 26 and additional machining solution is supplied through the gap between the electrode 14 and the workpiece 22 into the tank 10. During the subsequent discharge machining of the workpiece 22, sludge and combustible gases are produced but are withdrawn from the tank 12 through the exhaust pipe 24. In the conventional discharge machining apparatus disclosed in FIG. 1 it is difficult to adequately set the amounts of solution supplied and exhausted from tank 12 and accordingly, combustible gases tend to accumulate in the upper portion of the tank adjacent the exhaust pipe 24 whereby an accidental explosion of the combustible gases could cause damage to the apparatus.

SUMMARY OF THE INVENTION

The present invention provides a new and improved discharge machining apparatus in which all of the above mentioned difficulties and drawbacks are eliminated and optimum machining performance can be maintained by periodically exhausting the combustible gases accumulated in the upper portion of the tank and the sludge accumulated in the lower portion of the tank thereby preventing explosions and increasing the efficiency of the operation.

The present invention provides a new and improved discharge machining apparatus wherein the pressure caused by the explosion of the combustible gases can be readily vented externally of the tank should such an explosion accidentally occur thereby preventing damage to the apparatus. A safety valve is provided in the tank to allow the venting of the gases should an explosion occur.

The present invention provides a new and improved discharge machining apparatus wherein the combustible gases can readily be exhausted by means of a flexible pipe associated with the exhaust pipe to permit reciprocal and rotational movement of the inlet end of the exhaust pipe to further improve the safety of the apparatus.

The present invention provides a new and improved discharge machining apparatus wherein the construction is simple and inexpensive and damage to the apparatus can be completely avoided due to the explosion of combustible gases accumulated in the tank by forming the safety valve as a spring-type safety valve which will open at a predetermined low pressure.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 3 is a schematic view showing another embodiment of a discharge machining apparatus according to the present invention.

DETAILED DESCRIPTION OF THE INVENTION

Figure 1:
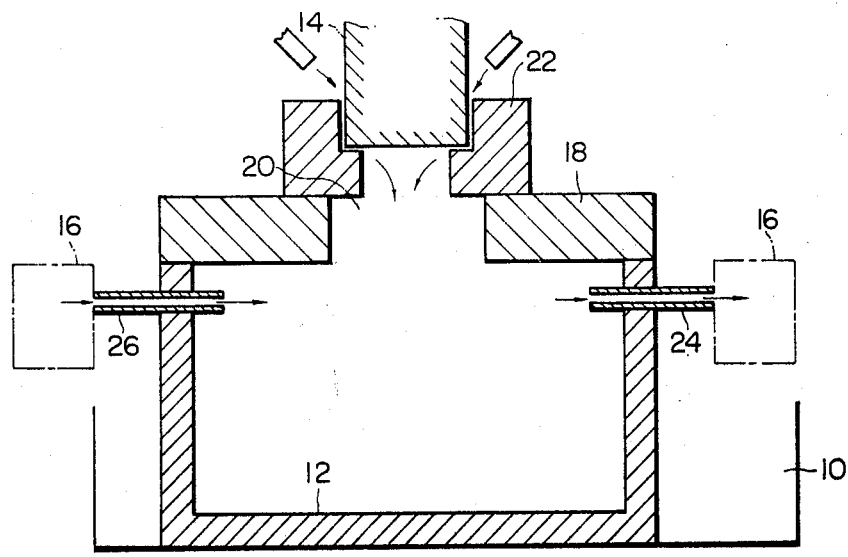
FIG. 1 is a schematic view showing a prior art discharge machining apparatus.
Figure 2:
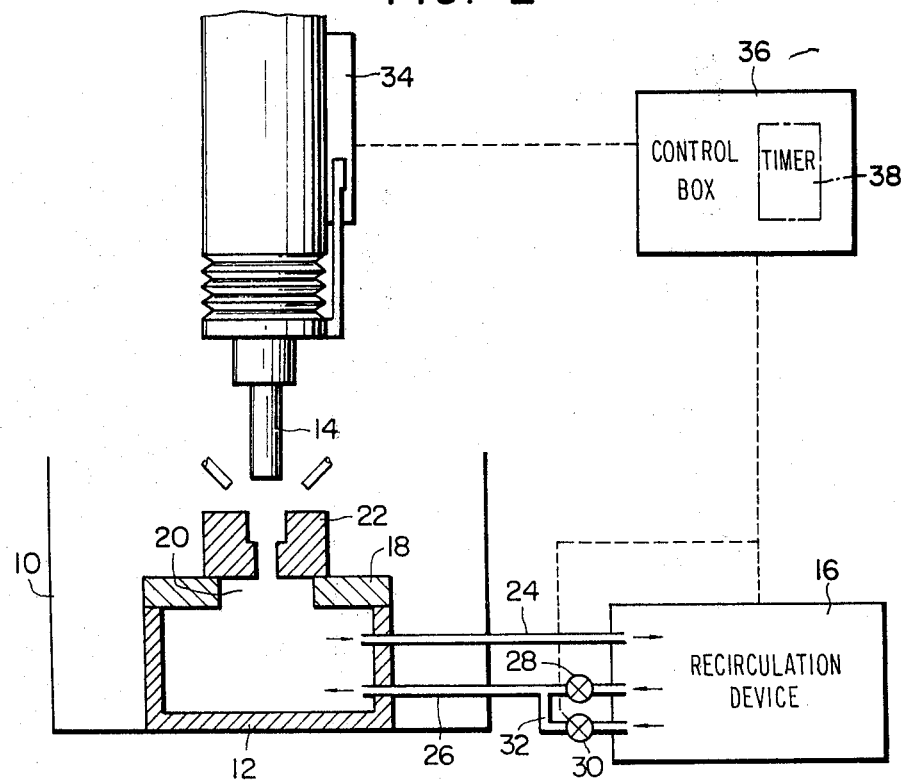
FIG. 2 is a schematic view showing a first embodiment of a discharge machining apparatus according to the present invention.

In a first embodiment of the discharge machining apparatus according to the present invention as shown in FIG. 2, the apparatus includes a machining station which includes a tank 12 for holding a machining solution, an overflow container 10, an electrode 14 and a machining solution recirculating device 16. A machining anvil block 18 is placed on the upper end of the tank 12 and a workpiece 22 is secured to the upper surface of the anvil block 18 over a machining hole 20 which is in alignment with the electrode 14.

The machining solution recirculating device 16 includes an exhaust pipe 24 and an injection pipe 26 provided between the recirculation device 16 and the tank 12. The injection pipe 26 is branched at the side of the machining solution recirculating device 16 and electromagnetic or solenoid valves 28 and 30 are located in the branches of the pipe. One of the branches constitutes an auxiliary pipe 32 which is provided with the valve 30.

The electrode 14 is movable toward and away from the workpiece 22 under the control of the unit 34. A control box 36 having a timer 38 is associated with the unit 34 and the solenoid valves 28 and 30 for controlling the valves in conjunction with the movement of the electrode.

In the operation of the discharge machining apparatus as shown in FIG. 2, the machining solution recirculation device 16 is operated as the electrode 14 approaches the workpiece 22 to supply machining solution into the tank 12 through the injection pipe 26. Simultaneously the machining solution is withdrawn from the tank 10 through the exhaust pipe 24. The recirculation device 16 is set so that the amount of machining solution being exhausted through the pipe 24 is greater than the amount of machining solution injected into the tank 12 from the injection pipe 26. Additional machining solution is supplied through the gap between the electrode 14 and the workpiece 22 into the tank 10 at the same time so that the total solution supplied equals the solution being exhausted.

During the discharge machining of the workpiece 22 sludge and combustible gases are produced in the tank 12. While most of the sludge and combustible gases thus produced are exhausted through the exhaust pipe 24 continued operation of the discharge machining for an extending period of time will cause sludge to accumulate in the lower portion of the tank 12 and combustible gases to accumulate in the upper portion of the tank 12 thereby causing the machining performance to deteriorate while increasing the danger of an explosion. However after a predetermined period of time has elapsed on the timer 38 contained in the control box 36, the electrode 14 is raised a distance from 1 to 10 mm.

Additional machining solution is injected through the auxiliary pipe 32 into the tank 12 so that the total input of solution is greater than that being withdrawn through the exhaust pipe 24. Thus with the electrode raised for a predetermined period of time, as for example 1-10 seconds, the sludge and combustible gases will be flushed from the tank 12 into the overflow container 10. After the predetermined period of time the valve 30 is closed to restore the input flow of solution to the normal volume, the electrode 14 is returned to a position adjacent to workpiece 22 and the discharge machining operation is resumed.

Since the electrode 14 is vertically movable upwardly and downwardly, the combustible gases can be externally exhausted from the tank 12 as the electrode 14 is raised upwardly without supplying additional fluid through pipe 32. Thus a periodic raising and lowering of the electrode 14 can prevent the explosion of combustible gases which ordinarily accumulate in the upper portion of the tank immediately below the workpiece. When the electrode 14 is suitably raised by adequately setting the timer 38 provided in the control box 36 in accordance with the material, shape and machining conditions relative to the workpiece 22, it is possible to save time and labor and thereby improve the machining efficiency of the apparatus while reducing the danger of explosion.

While the foregoing arrangements considerably reduces the danger of explosion, the raising of the electrode does cause a loss of machining time. In the embodiment of FIG. 3, an arrangement is provided for removing the combustible gases and compensating for a possible explosion without the necessity for frequent raising and lowering of the electrode.

In the embodiment in FIG. 3, the exhaust pipe 24 includes a section of flexible pipe 40 which allows the nozzle 42 to be shifted toward and away from the center of the machining hole 20 in the anvil block 18. The nozzle 42 is also rotatable about the axis of the portion thereof which extends through the wall of the tank as indicated by the curved arrow in FIG. 3. A clamping mechanism 44 is mounted on the side of the tank for clamping the nozzle 42 in a desired position.

A safety valve 46 is mounted in one side of the tank and includes a valve member 50 adapted to seat and completely cover the aperture 48 in the side of the tank. A support member spanning the aperture 48 is provided for supporting the spring 52 which bears against an adjustable nut 56 threaded on the stem of the valve member 50. Therefore the spring 52 normally biases the valve member 50 into closing relation with respect to the aperture 48 and will allow the valve to open under a relatively low pressure, as for example from 0.5 to 2 kg/cm$^2$.

When the electrode 14 is in the proper position relative to the workpiece 22 and discharge machining is carried out, the solution recirculation device 16 operates to supply the machining solution from the injection pipe 26 into the tank. Simultaneously the solution is withdrawn from the tank through the exhaust pipe 24. The nozzle 42 of the exhaust pipe 24 is disposed within the machining hole 20 in the anvil block 18 so as to more efficiently remove the sludge and combustible products which are produced during the discharge machining operation.

When the discharge machining operation is carried out for a predetermined period of time, the sludge also tends to accumulate in the lower portion of the tank. At this time the electrode 14 can be raised, the valve 30 opened and the tank flushed in the manner described above with respect to the embodiment of FIG. 2.

Since the location of the nozzle 42 of the exhaust pipe 24 is axially and rotatably movable within the tank, the inlet end of the nozzle can be located at the position where the combustible gases tend to accumulate more quickly and accordingly the combustible gases can be removed more efficiently. Even if some combustible gases do explode, the pressure caused by the explosion causes the exhaust valve 46 to open allowing the exploding gases to be discharged to the exterior of the tank without any damage to the workpiece or electrode.

Although the invention has been particularly shown and described with reference to preferred embodiments thereof, it will be understood by those in the art that the foregoing and other changes in form and details may be made therein without departing from the spirit and scope of the invention.

What is claimed is:

1. A discharge machining apparatus comprising a machining station having a tank for holding a machining solution, apertured cover means for supporting a workpiece electrode on the upper surface of said tank, machining solution recirculation means for supplying and exhausting machining solution into and out of said tank, including means for directing solution over said workpiece through said apertured cover means and an exhaust pipe having an inlet end located within said tank which is reciprocable and rotatable about its axis to adjustably locate said inlet end relative to said apertured cover means, a moveable electrode, means for vertically moving said electrode towards and away from said workpiece to periodically vent said tank, means for controlling the amount of machining solution recirculated through said tank to periodically overflow said tank when said electrode is raised and safety valve means in said tank.

2. An apparatus as set forth in claim 1 wherein said inlet end of said exhaust pipe has a L-shaped configuration with one leg thereof extending into said aperture.

* * * * *